(12) United States Patent
Kueckendahl et al.

(10) Patent No.: US 9,007,660 B2
(45) Date of Patent: *Apr. 14, 2015

(54) MARKING AND/OR SCANNING HEAD, APPARATUS, AND METHOD

(75) Inventors: Peter Joerg Kueckendahl, Bad Oldesloe (DE); Daniel Joseph Ryan, Sycamore, IL (US)

(73) Assignee: Alltec Angewandte Laserlicht Technologie GmbH, Selmsdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/976,779

(22) PCT Filed: Dec. 22, 2011

(86) PCT No.: PCT/EP2011/006520
§ 371 (c)(1),
(2), (4) Date: Jun. 27, 2013

(87) PCT Pub. No.: WO2012/089325
PCT Pub. Date: Jul. 5, 2012

(65) Prior Publication Data
US 2013/0278973 A1 Oct. 24, 2013

(30) Foreign Application Priority Data

Dec. 30, 2010 (EP) .................................. 10016202

(51) Int. Cl.
*H04N 1/024* (2006.01)
*B41J 2/00* (2006.01)
*B41J 2/47* (2006.01)
(Continued)

(52) U.S. Cl.
CPC ............... *H04N 1/0249* (2013.01); *B41J 2/46* (2013.01); *B41J 3/4073* (2013.01); *B41J 3/54* (2013.01); *B41J 3/543* (2013.01); *B41J 25/003* (2013.01); *H04N 1/02472* (2013.01)

(58) Field of Classification Search
USPC ............. 358/472; 356/28; 347/110, 225, 241; 101/484
See application file for complete search history.

(56) References Cited

U.S. PATENT DOCUMENTS 4,707,063 A 11/1987 Plummer
4,816,940 A * 3/1989 Nagasawa et al. ......... 360/77.15
(Continued)

FOREIGN PATENT DOCUMENTS

DE 2401322 1/1974
DE 3826113 A1 2/1989
(Continued)

OTHER PUBLICATIONS

International Application No. PCT/EP2011/006520, Written Opinion of International Search Authority.
(Continued)

*Primary Examiner* — Charlotte M Baker
*Assistant Examiner* — Rury Grisham
(74) *Attorney, Agent, or Firm* — Hoffman Warnick LLC (57) ABSTRACT

The invention relates to a marking and/or scanning head comprising a plurality of receiving spaces in which individual marking and/or sensing devices can be arranged for marking and/or scanning an object, wherein the receiving spaces are arranged in at least two sub-arrays, wherein at least one sub-array is movable and/or rotatable with regard to at least one other sub-array. The invention further relates to a marking and/or scanning apparatus and a method for operating a marking and/or scanning head or apparatus.

10 Claims, 10 Drawing Sheets

(51) Int. Cl.
*B41J 15/14* (2006.01)
*B41J 2/46* (2006.01)
*B41J 3/407* (2006.01)
*B41J 3/54* (2006.01)
*B41J 25/00* (2006.01)

(56) References Cited

U.S. PATENT DOCUMENTS

| | | | |
|---|---|---|---|
| 5,157,265 A * | 10/1992 | Uomala | 250/559.24 |
| 5,298,717 A * | 3/1994 | DeRossett, Jr. | 219/121.68 |
| 5,399,032 A | 3/1995 | Itoh et al. | |
| 5,477,259 A | 12/1995 | Iwasa | |
| 5,777,634 A | 7/1998 | Okamura et al. | |
| 5,784,098 A | 7/1998 | Shoji et al. | |
| 5,904,037 A * | 5/1999 | Grulick et al. | 57/264 |
| 5,992,318 A * | 11/1999 | DiBello et al. | 101/181 |
| 6,189,991 B1 | 2/2001 | Wen et al. | |
| 6,286,927 B1 | 9/2001 | Taneya et al. | |
| 6,381,377 B1 | 4/2002 | Wang | |
| 6,469,729 B1 | 10/2002 | Ryan | |
| 6,738,086 B2 | 5/2004 | Oka | |
| 6,855,921 B1 | 2/2005 | Stopperan et al. | |
| 7,354,130 B2 | 4/2008 | Arakawa | |
| 7,448,719 B1 | 11/2008 | Newell | |
| 7,564,020 B2 | 7/2009 | Sergyeyenko | |
| 7,671,337 B1 | 3/2010 | Tidwell | |
| 7,908,968 B2 | 3/2011 | McCoin et al. | |
| 2002/0001004 A1 | 1/2002 | Mantell et al. | |
| 2002/0101469 A1 | 8/2002 | Wade et al. | |
| 2002/0139273 A1* | 10/2002 | Murata et al. | 101/484 |
| 2002/0191069 A1* | 12/2002 | Oka | 347/241 |
| 2003/0016348 A1 | 1/2003 | Sallee | |
| 2003/0210861 A1 | 11/2003 | Weiss et al. | |
| 2003/0235373 A1 | 12/2003 | Ishii et al. | |
| 2004/0160478 A1 | 8/2004 | Weijkamp et al. | |
| 2005/0122548 A1 | 6/2005 | Cunnigan et al. | |
| 2005/0123303 A1 | 6/2005 | Guttman et al. | |
| 2005/0140770 A1 | 6/2005 | Kang et al. | |
| 2005/0286093 A1 | 12/2005 | Sumi et al. | |
| 2006/0066924 A1 | 3/2006 | Delueg | |
| 2006/0109525 A1 | 5/2006 | Evans | |
| 2007/0091132 A1 | 4/2007 | Lim | |
| 2007/0279713 A1 | 12/2007 | Feng et al. | |
| 2008/0055352 A1 | 3/2008 | Toh et al. | |
| 2008/0246962 A1 | 10/2008 | Yang | |
| 2010/0002057 A1 | 1/2010 | Hatasa et al. | |
| 2010/0214387 A1 | 8/2010 | Fox et al. | |
| 2010/0231929 A1 | 9/2010 | Kakigi | |
| 2013/0021398 A1 | 1/2013 | Mizes et al. | |
| 2013/0286147 A1* | 10/2013 | Kueckendahl et al. | 347/225 |
| 2013/0286148 A1 | 10/2013 | Kueckendahl et al. | |
| 2013/0286149 A1* | 10/2013 | Kueckendahl et al. | 347/225 |
| 2013/0293658 A1* | 11/2013 | Kueckendahl et al. | 347/110 |
| 2013/0328978 A1 | 12/2013 | Senkino et al. | |
| 2013/0342823 A1* | 12/2013 | Kueckendahl et al. | 356/28 |

FOREIGN PATENT DOCUMENTS

| | | |
|---|---|---|
| EP | 0121369 A2 | 10/1984 |
| EP | 0832754 B1 | 12/1993 |
| EP | 0832752 A2 | 4/1998 |
| EP | 1266763 A1 | 12/2002 |
| EP | 1640169 A3 | 9/2005 |
| EP | 1640169 A2 | 3/2006 |
| EP | 1640169 A3 | 10/2007 |
| EP | 2105309 A1 | 9/2009 |
| JP | 59136267 | 8/1984 |
| JP | 05185686 | 7/1993 |
| JP | 2001332806 A | 11/2001 |
| JP | 2007090814 A | 4/2007 |
| JP | 2008126471 A | 6/2008 |
| JP | 2009037128 A | 2/2009 |
| WO | 8505187 A1 | 11/1985 |
| WO | 2006037973 A1 | 4/2006 |
| WO | 2007107030 A1 | 9/2007 |
| WO | 2008104222 A1 | 9/2008 |
| WO | 2009153795 A1 | 12/2009 |

OTHER PUBLICATIONS

International Application No. PCT/EP2011/006514, Written Opinion of International Search Authority, Mar. 23, 2012.
International Application No. PCT/EP2011/006516, International Search Report, dated Mar. 23, 2012, 3 pages.
International Application No. PCT/EP2011/006518, Written Opinion of International Search Authority, Mar. 23, 2012.
U.S. Appl. No. 13/976,804, Office Action dated Jul. 8, 2014.
U.S. Appl. No. 13/976,804, Notice of Allowance dated Mar. 20, 2014.
U.S. Appl. No. 13/976,809, Office Action dated May 27, 2014.
U.S. Appl. No. 13/977,159, Office Action dated Jun. 20, 2014.
U.S. Appl. No. 13/976,832, Notice of Allowance and Fees Due dated Jun. 24, 2014.
U.S. Appl. No. 13/976,793, Office Action dated Jul. 1, 2014.
U.S. Appl. No. 13/977,151, Notice of Allowance and Fees Due dated Aug. 4, 2014.
U.S. Appl. No. 13/977,156, Office Action dated Jul. 9, 2014.
International Application No. PCT/EP2011/006517, Written Opinion of International Search Authority, Mar. 23, 2012.
International Application No. PCT/EP2011/006521, Written Opinion of International Search Authority, Mar. 23, 2012.
International Application No. PCT/EP2011/006521, Written Opinion of International Examining Authority, Aug. 3, 2013.
International Application No. PCT/EP2011/006515, International Preliminary Report on Patentability, Jan. 21, 2013, Mar. 8, 2012.
International Application No. PCT/EP2011/006515, Written Opinion on Search Report, Dec. 22, 2011.
International Application No. PCT/EP2011/006516, Written Opinion of International Search Authority, Mar. 8, 2012.
International Application No. PCT/EP2011/006522, Written Opinion of International Search Authority, Mar. 23, 2012.
International Application No. PCT/EP2011/006522, International Report on Patentability, Jan. 17, 2013.
International Application No. PCT/EP2011/00652023, Written Opinion of International Search Authority, Mar. 23, 2012.
International Application No. PCT/EP2011/006519, Written Opinion of International Search Authority, Mar. 23, 2012.
International Application No. PCT/EP2011/006519, Preliminary Report on Patentability, Feb. 12, 2013.
U.S. Appl. No. 13/976,832, Notice of Allowance dated Oct. 8, 2014, A593, 61 pages.
U.S. Appl. No. 13/976,814, Notice of Allowance dated Oct. 21, 2014, A581, 72 pages.
U.S. Appl. No. 13/976,804, Final Office Action dated Oct. 24, 2014, A585, pp. 18.
U.S. Appl. No. 13/977,159, Final Office Action dated Oct. 10, 2014, A605, 53 pages.
U.S. Appl. No. 13/977,156, Final Office Action dated Dec. 5, 2014, A617, 13 pages.
U.S. Appl. No. 13/976,793, Notice of Allowance dated Dec. 9, 2014, A609, 66 pages.
U.S. Appl. No. 13/976,814, Notice of Allowance Dated Dec. 29, 2014, A581, 10 pages.

* cited by examiner

MARKING AND/OR SCANNING HEAD, APPARATUS, AND METHOD

FIELD OF THE INVENTION

The present invention relates to a marking and/or scanning head comprising a plurality of receiving spaces in which individual marking and/or sensing devices can be arranged for marking and/or scanning an object. Such a marking and/or scanning head generally forms a part of a marking and/or scanning apparatus for marking and/or scanning an object.

The invention further relates to a marking and/or scanning apparatus for marking and/or scanning an object and a method for operating a marking and/or scanning head.

RELATED ART

There are so-called page-wide marking heads which have a plurality of marking devices arranged for example in a line array. In order to mark an object, the object is moved in an advance or product movement direction relative to the page-wide marking head. If the object to be marked is smaller than the page-wide marking head or is only to be partially marked, a part of the marking devices will be inactive.

On the other hand there are marking heads which are adapted to move line by line over an object to be marked. To this end, a driving mechanism for moving the marking head and/or the object is provided. Due to the two-dimensional movement path of the marking head relative to the object, the risk of a failure of the driving mechanism is higher than in case of a page-wide marking head.

The same can apply for a scanning head and a scanning apparatus for scanning an object.

An example of a page-wide printing head is disclosed in U.S. Pat. No. 6,295,080 B1. The image recording apparatus described in this document comprises a print head having a plurality of light emitting elements arranged in one or more lines in a fixed pattern.

SUMMARY OF THE INVENTION

One object of the invention is to provide a marking and/or scanning head and apparatus for marking and/or scanning an object and a method for operating a marking and/or scanning head or apparatus having an enhanced flexibility.

The object is solved according to the invention by a marking and/or scanning head, a marking and/or scanning apparatus, and a method for operating a marking and/or scanning head. Preferred embodiments are given in the dependent claims.

The marking and/or scanning head may be characterized in that the receiving spaces are arranged in at least two sub-arrays, wherein at least one sub-array is movable and/or rotatable relative to at least one other sub-array.

The marking and/or scanning apparatus may be characterized in that at least two marking and/or scanning heads are provided, wherein at least one marking and/or scanning head is movable and/or rotatable relative to at least one other marking and/or scanning head.

The method for operating a marking and/or scanning head or apparatus may be characterized in that a first sub-array of marking and/or sensing devices is moved and/or rotated relative to a second sub-array of marking and/or sensing devices and the object is marked and/or scanned by the first and second sub-arrays of marking and/or sensing devices.

The method for operating a marking and/or scanning head or apparatus is characterized in that a first sub-array of marking and/or sensing devices is moved and/or rotated relative to a second sub-array of marking and/or sensing devices and the object is marked and/or scanned by the first and second sub-arrays of marking and/or sensing devices.

One general idea of the invention is to provide a marking and/or scanning apparatus for marking and/or scanning an object, comprising a plurality of receiving spaces in which individual marking and/or sensing devices can be arranged for marking and/or scanning the object, wherein the receiving spaces are arranged in at least two sub-arrays, and wherein at least one sub-array is movable and/or rotatable with regard to at least one other sub-array.

In a first aspect of the invention the receiving spaces are arranged in a common marking and/or scanning head. One first idea is therefore to provide a marking and/or scanning head having a plurality of marking and/or sensing devices, wherein at least one sub-array of the marking and/or sensing devices is arranged in the marking and/or scanning head in a movable and/or rotatable manner.

In a second aspect of the invention the sub-arrays are arranged in individual marking and/or scanning heads, which are moveable and/or rotatable relative to each other.

Another idea of the invention is to provide a marking and/or scanning head having a plurality of marking and/or sensing devices which can be placed at different positions in the marking and/or scanning head, according to a marking and/or scanning operation to be performed. It is therefore possible to reduce the total number of marking and/or scanning devices as compared to a known page-wide marking and/or scanning head.

Yet another idea of the invention is to provide a marking and/or scanning head in which at least a part of the marking and/or sensing devices is movable and/or rotatable. The marking and/or scanning head can include a housing in which the marking and/or sensing devices are arranged. The housing can be mounted on a marking and/or scanning apparatus in a fixed position.

The marking and/or sensing devices may be preferably arranged in a common plane, which is may be parallel to a surface of an object to be marked and/or scanned. The marking and/or sensing devices can be movable and/or rotatable within the plane in which they are arranged.

The plurality of marking and/or sensing devices of the marking and/or scanning head can be referred to as a main array of marking and/or sensing devices. According to an aspect of the invention the individual marking and/or sensing devices are arranged in the marking and/or scanning head in at least two separate sub-arrays which can in particular be spaced from one another. Each of the sub-arrays includes a plurality of marking and/or sensing devices. The marking and/or sensing devices within one sub-array may be preferably arranged in a fixed pattern. At least one of the sub-arrays is movable and/or rotatable within the housing of the marking and/or scanning head.

An idea of the invention is to arrange the marking and/or sensing devices such that a projected distance between the sub-arrays of marking and/or sensing devices can be varied through a movement and/or a rotation of at least one of the sub-arrays. In other words, when the marking and/or scanning head is mounted to a marking and/or scanning apparatus, in which the object to be marked and/or scanned is moved relative to the marking and/or scanning head in an advance direction, the distance of the sub-arrays in a transverse direction can be changed by a rotation and/or movement of at least one sub-array. The transverse direction is in this case a direction extending transversely, more particular perpendicularly, to the advance direction.

In a preferred embodiment of the invention at least one sub-array is movable along a linear movement path. In a marking and/or scanning apparatus the linear movement path may preferably extend along the transverse direction, that is, in particular transversely to the advance or object movement direction. The linear movement path may allow an easy adjustment of the marking and/or scanning width. That is, the marking and/or scanning width can be changed by moving the sub-array along the linear movement path in the transverse direction.

In another preferred embodiment at least one sub-array is rotatable about a rotation axis which extends transversely to a plane or surface of an object to be marked and/or scanned. To this end, the marking and/or scanning head may comprise a holding frame and the at least one sub-array may be connected to the holding frame in a rotatable manner. The sub-array may in particular be mounted on a mounting frame which is rotatable with regard to the holding frame. The mounting frame can in particular be a mounting plate.

The rotation axis of the sub-array and the mounting frame, respectively, can be a central axis of the marking and/or scanning head. The central axis can be a rotation axis of a generally cylindrical marking and/or scanning head. In order to change the position of the sub-array in the transverse direction, it may be preferred that the sub-array is eccentrically mounted on the rotatable mounting frame.

Furthermore, it may be preferred that at least one of the sub-arrays is rotatable about a rotation axis running through its centre, that is, the centre of the respective sub-array. In other words, the sub-array can be rotatable about itself. In particular if the respective sub-array is a two-dimensional array, the rotation of the array about itself provides a method of adjusting the marking and/or scanning resolution to be achieved with the array.

In another preferred embodiment the marking and/or scanning head comprises a holding or support frame, the at least two sub-arrays are mounted on a common mounting frame which is movable and/or rotatable relative to the holding frame and the sub-arrays are each rotatable about a rotation axis running through the centre of the respective sub-array. With this embodiment, the distance of the sub-arrays can be changed through a rotation of the mounting frame while at the same time the resolution can be maintained at a constant value by rotating the individual sub-arrays about their own axes.

It can also be advantageous that two or more or even all sub-arrays are mounted on a common mounting plate which is movable and/or rotatable with regard to the holding frame. In addition, one or more of the sub-arrays can be movably and/or rotatably mounted on the common mounting plate. The mounting plate can in particular be rotatable about a central axis of the marking and/or scanning head.

An enhanced resolution can be achieved when the receiving spaces of at least one sub-array are arranged in a plurality of rows and columns, such that a two-dimensional array of receiving spaces is formed.

The two-dimensional array of receiving spaces and marking and/or sensing devices, respectively, is preferably rotatable or tiltable about an axis extending transversely, in particular at right angles, to the advance direction. Through the rotation of the array, the receiving spaces can be arranged in a position, in which the receiving spaces of a successive row are offset with regard to the receiving spaces of a preceding row in the transverse direction. The rotatable, two-dimensional array, in which the receiving spaces of a successive row may be interposed between receiving spaces of a preceding row in the advance direction, allows for an enhanced and variable marking and/or scanning resolution. The smaller the offset and the greater the number of rows, the greater is the resolution to be achieved.

In a preferred embodiment the receiving spaces of the marking and/or scanning head are receiving holes formed in a receiving plate. The receiving holes may in particular be through-holes. The marking and/or sensing devices may be inserted into the receiving holes and thereby coupled to the receiving plate. The receiving spaces may be entirely or only partially equipped with marking and/or sensing devices.

It may be preferred that the receiving spaces of the marking and/or scanning head are configured to be selectively equipped with marking devices and/or with sensing devices. Moreover, it may be preferred that marking devices and sensing devices are provided which have corresponding connector sections, so that a receiving space of the marking and/or scanning head may be selectively equipped either with a marking device or with a sensing device.

The rows and columns, in which the receiving spaces are arranged, may in particular extend perpendicularly to each other. Such an orthogonal array, in which the receiving spaces are arranged in a rectangular pattern, can be fabricated and provide a good resolution.

It may be preferred that the receiving spaces of each sub-array have an equal spacing in a row direction and/or in a column direction. In other words, a pitch of the receiving spaces in the row direction and/or the column direction may be preferably equal throughout the array. The equal pitch may allow for a constant marking and/or scanning resolution.

The marking devices may in particular be marking devices for marking, printing and/or engraving the object with at least one laser beam. In a preferred embodiment a marking device comprises a ferrule with a fibre coupled to a laser device. However, the marking devices can also include inkjet nozzles, thermal printing devices, needle printing devices, micro pad printing devices, water jets, electrical discharge machining devices and/or any other types of marking devices.

A sensing device may for example comprise a PIN diode, a photo diode, a photo transistor, a micro antenna, a capacity sensor element, an inductive sensor element and/or a chemical sensor element for sensing or scanning an object. A sensing device may in particular be an optical sensor device.

It is possible according to the invention to include different types of marking and/or sensing devices in the marking and/or scanning head. In particular, the sub-arrays may contain different marking and/or sensing devices.

In another preferred embodiment of the invention a marking and/or sensing device may comprise a ferrule with at least one fibre arranged therein. The ferrule is a housing in which the at least one fibre, in particular a fibre end, is arranged. In case of a marking device, the at least one fibre may be coupled to a lighting element, for example a laser, for marking or engraving the object by means of a laser beam. In case of a sensing device, the at least one fibre may be coupled to a sensor element for detecting light received through the fibre.

The invention also relates to a marking and/or scanning apparatus comprising a marking and/or scanning head and further comprising a driving mechanism for providing a relative movement of an object to be marked and/or scanned relative to the marking and/or scanning head in an advance direction during a marking and/or scanning operation. The advance direction can in particular be a linear movement direction.

The marking and/or scanning apparatus may for example be a printing apparatus, in particular for printing or engraving an object by means of at least one laser beam. In another embodiment the marking and/or scanning apparatus may be a scanner for scanning an object.

The object can be marked and/or scanned at least in part by a successive operation of the individual marking and/or sensing devices, that is, the object may be marked and/or scanned line by line or pixel by pixel.

The marking and/or scanning apparatus can have one or more marking and/or scanning heads. If more than one marking head is provided, it may be preferred according to the invention that at least one marking head is connected to the marking and/or scanning apparatus in a movable and/or rotatable manner.

In order to provide the possibility to mark and/or scan surfaces of an object that are inclined to one another, it may be advantageous if at least one marking and/or scanning head is moveable along a three-dimensional moving path. The marking and/or scanning head may therefore be tilted in at least two different planes so that the marking and/or scanning head can generally be positioned in any desired orientation.

An example usage for such a multi-head configuration is printing or imaging products simultaneously at different locations that cannot be reached by a single head because of the distance, orientation or angle of the location. This may apply for instance when printing on products at a front and back side or printing on bottle labels and caps.

BRIEF DESCRIPTION OF THE DRAWINGS

The invention will now be further described with reference to the attached figures, wherein.

In all figures, identical or corresponding components are identified by identical reference signs.

DETAILED DESCRIPTION OF THE INVENTION

Figure 1:
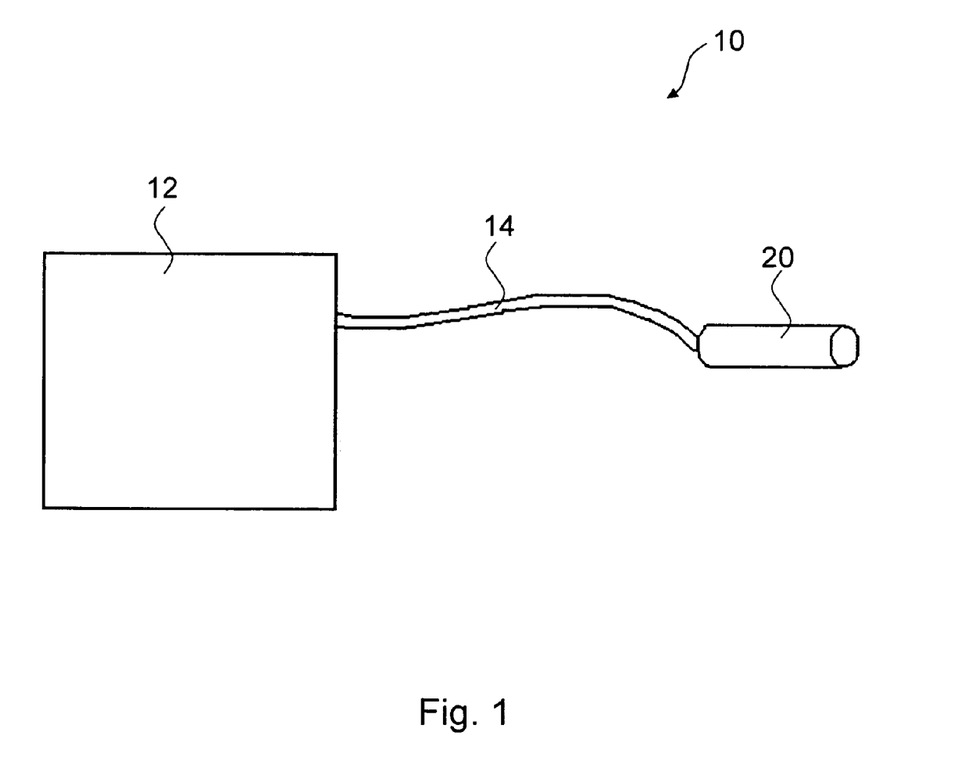
FIG. 1 shows a principle structure of a marking and/or scanning apparatus.

FIG. 1 shows a principle structure of a marking and/or scanning apparatus 10 according to one embodiment of the invention. The marking and/or scanning apparatus 10 may in particular be a matrix or pixel printer or a matrix or pixel scanner.

The marking and/or scanning apparatus 10 comprises a marking and/or scanning head 20 with a plurality of marking and/or sensing devices 40. The apparatus 10 further comprises a control and driving unit 12 for controlling the marking and/or sensing devices 40. The control and driving unit 12 is connected and the marking and/or scanning head 20 through an umbilical 14 which may house a plurality of fibres connected to the marking and/or sensing devices 40.

The marking and/or sensing devices 40 can for example be printing devices for printing an object. The printing devices can for example include ink jet nozzles for applying ink on the object or laser printing or engraving devices, which apply a printing with a laser beam directed onto the object.

Figure 2:
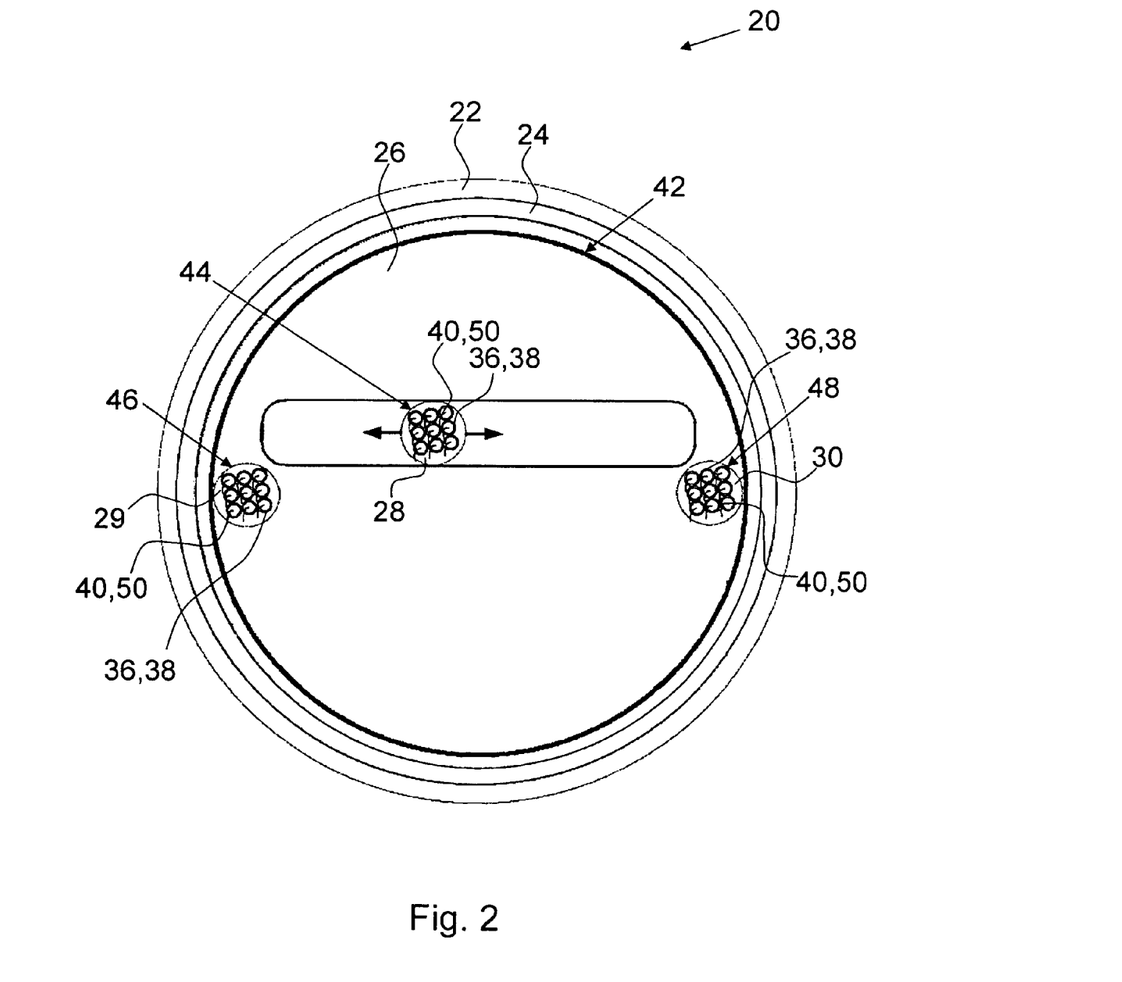
FIG. 2 shows a first embodiment of an inventive marking head.

FIG. 2 shows a first embodiment of an inventive marking and/or scanning head 20, which can in particular be a printing head and/or a sensor head. The marking and/or scanning head 20 has a generally cylindrical housing 22. The marking and/or scanning head 20 comprises a holding frame 24 which is fixedly attached to the housing 22 or can be an integral part of the housing 22.

The marking and/or scanning head 20 includes a plurality of receiving spaces 36 which are equipped with individual marking and/or sensing devices 40. The receiving spaces 36 are arranged in a generally two-dimensional array which is referred to as a main array 42 of receiving spaces 36.

The main array 42 comprises three individual sub-arrays 44, 46, 48. Of course, any other number of sub-arrays may be provided. Each of the sub-arrays 44, 46, 48 may apply an individual marking on an object or scan an individual portion of the object. The sub-arrays 44, 46, 48 can have equal configurations.

In each sub-array 44, 46, 48 the receiving spaces 36 are arranged in a rectangular pattern of rows and columns, wherein the number of rows equals the number of columns. The receiving spaces 36 have an equal spacing throughout their respective sub-array 44, 46, 48. Each of the sub-arrays 44, 46, 48 has a fundamentally rectangular outer shape. The pattern of the receiving spaces 36 of one sub-array is fixed.

The marking and/or scanning head 20 includes a mounting plate 26 on which the sub-arrays 44, 46, 48 are mounted. The mounting plate 26 has a circular shape corresponding to the cylindrical shape of the housing 22.

A first sub-array 44 is movable along a generally linear movement path which is parallel to a surface of an object to be marked and/or scanned, as shown by the arrows in FIG. 2. The movable sub-array 44 provides an option to place a marking on different positions on the object and/or to scan different portions of the object. The receiving spaces 36 of the sub-arrays 44, 46, 48 can be arranged on individual receiving plates 28, 29, 30. According to the embodiment of FIG. 2, the receiving plate 28 of the first sub-array 44 is movable along the mounting plate 26 of the head 20.

Figure 3:
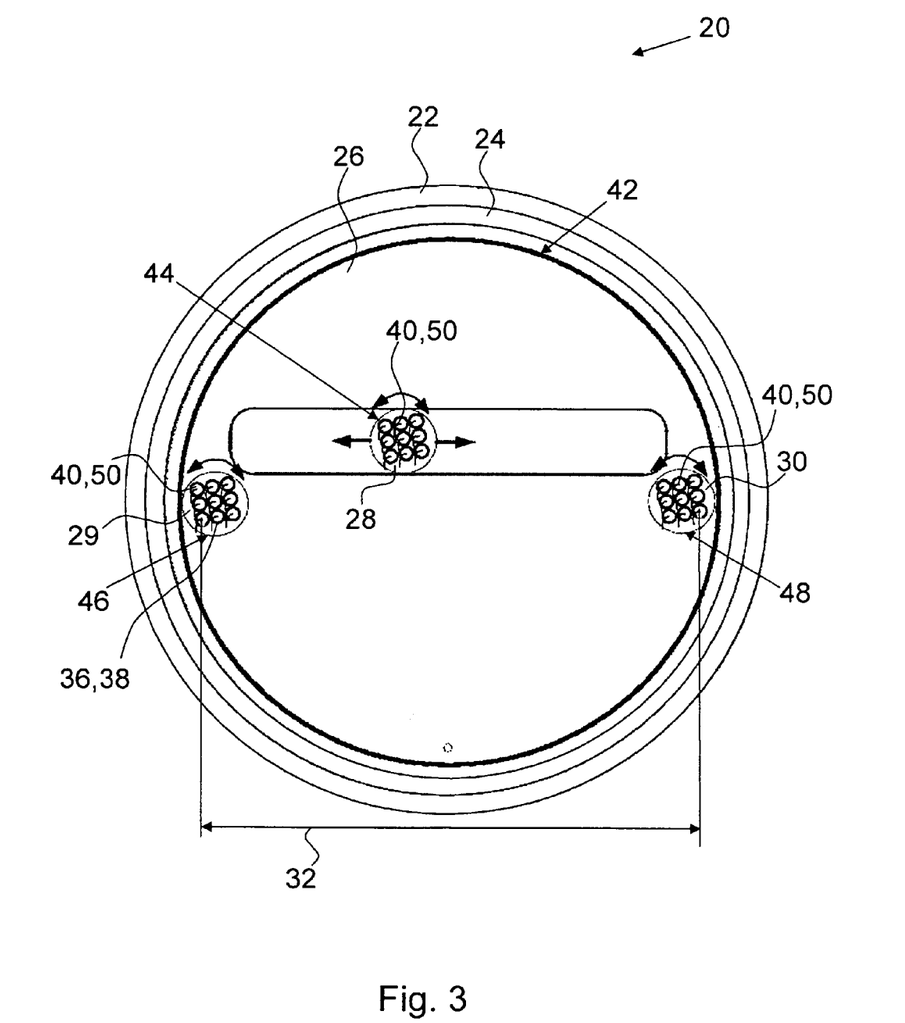
FIG. 3 shows a second embodiment of an inventive marking head.

Alternatively or in addition to being movable along the linear movement path, the first sub-array 44 may also be rotatable about itself, as shown by the arcuate arrow near the first sub-array 44 in FIG. 3. As shown in the same figure, the other sub-arrays 46, 48 may also be rotatable about their own axes. The possibility to individually rotate the sub-arrays 44, 46, 48 provides a way to individually change the marking and/or scanning resolution of the sub-arrays 44, 46, 48.

Generally spoken, the individual sub-arrays 44, 46, 48 are each rotatably and/or movably supported on the mounting plate 26. To this end, individual receiving plates 28, 29, 30 are provided for each sub-array 44, 46, 48. The individual receiving plates 28, 29, 30 are supported in a rotatable and/or movable manner on the mounting plate 26.

The receiving plates 28, 29, 30 may for example be metal plates, in particular steel plates, having a plurality of receiving holes 38 forming the receiving spaces 36. The receiving holes 38 each have a substantially circular cross-section and may in particular be through-holes.

Figure 4:
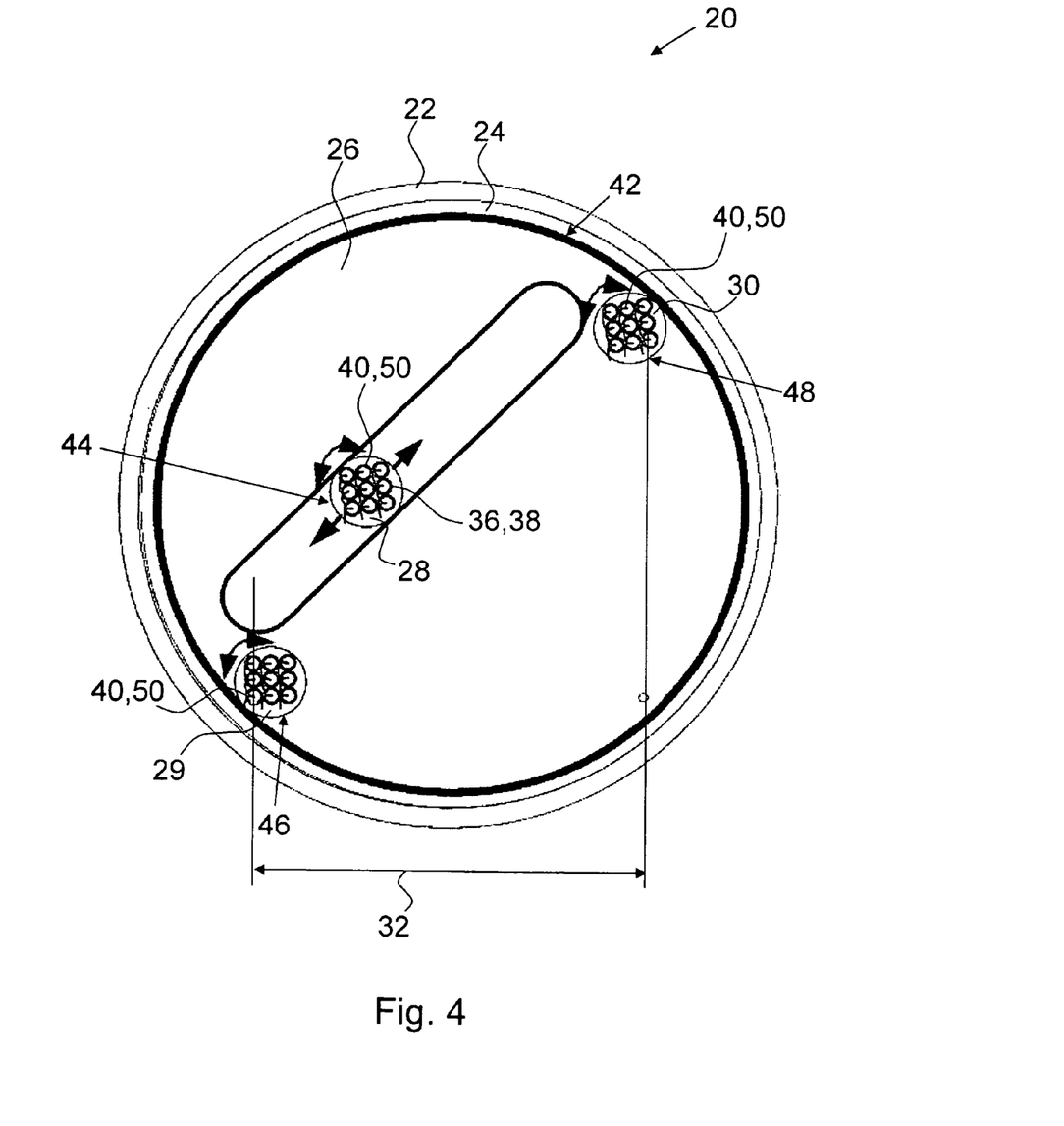
FIG. 4 shows a third embodiment of an inventive marking head.

FIG. 4 shows an embodiment of a marking and/or scanning head 20 where the mounting plate 26, on which particularly all of the sub-arrays 44, 46, 48 are mounted, is rotatably supported on the holding frame 24. Thus, when the mounting plate 26 is rotated, all sub-arrays 44, 46, 48 rotate simultaneously.

The second and third sub-arrays 46, 48 are eccentrically mounted on the rotatable mounting plate 26, so that the position of the sub-arrays and the distance 32 between them in a transverse direction 18 can be changed by rotating the mounting plate 26. In addition, each of the sub-arrays 44, 46, 48 is movable and/or rotatable, as described in connection with FIGS. 2 and 3.

Figure 5:
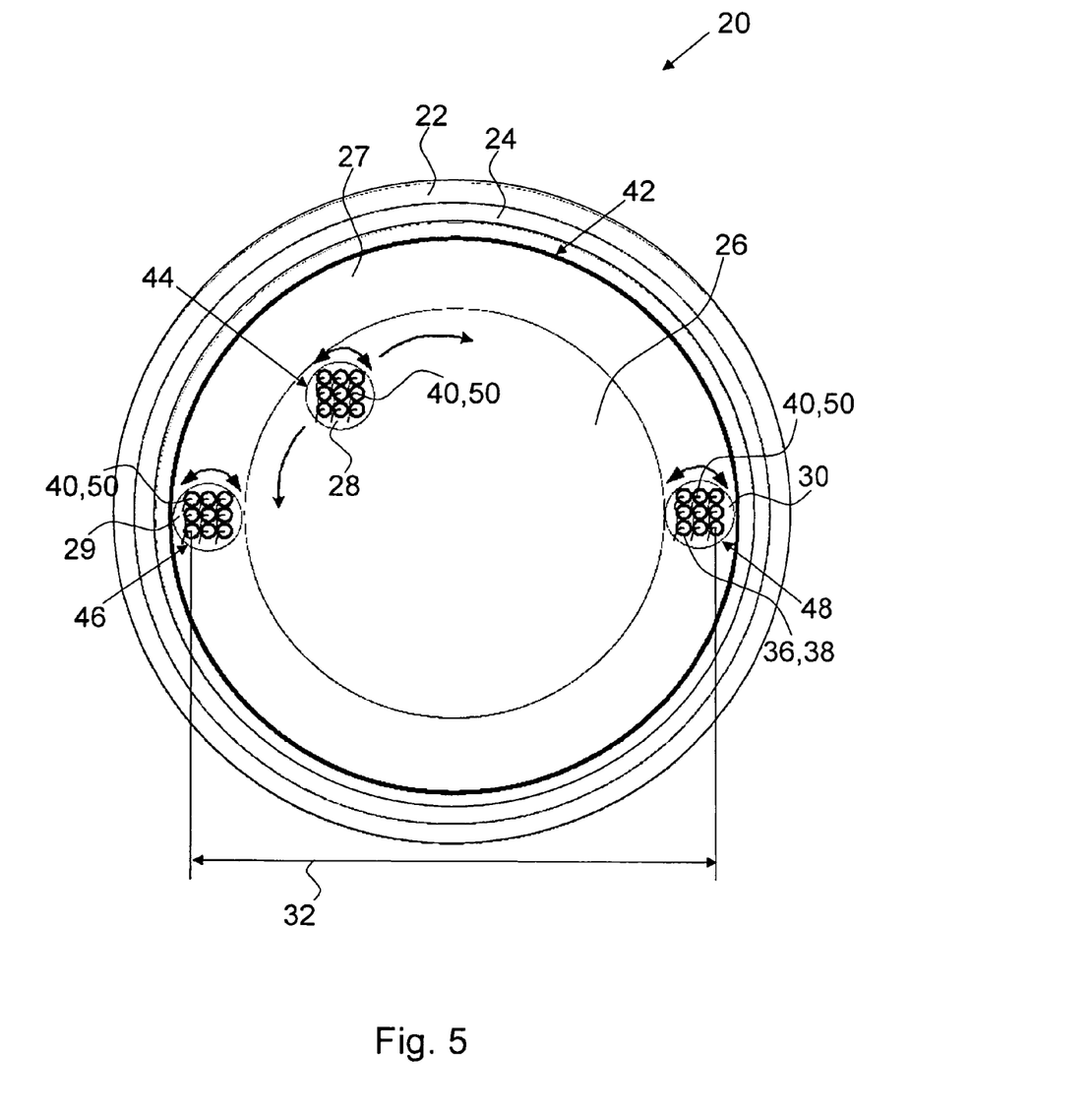
FIG. 5 shows a fourth embodiment of an inventive marking head.

An embodiment of a marking and/or scanning head 20 with two individually rotatable mounting plates 26, 27 is shown in FIG. 5. Each of the mounting plates 26, 27 is rotatable with regard to the holding frame 24 of the marking and/or scanning head 20 and supports at least one sub-array 44, 46, 48. The mounting plates 26, 27 can in particular be arranged concentrically to one another so that they rotate about a common rotation axis. In the shown embodiment, an inner mounting plate 26 supports one sub-array 44 and an outer mounting plate 27 supports two sub-arrays 46, 48. The sub-arrays 44, 46, 48 are each arranged eccentrically on their respective mounting plate 26, 27. Any other number of sub-arrays is possible.

In addition to being rotatable about the rotation axis of the mounting plate 26, 27 each of the sub-arrays 44, 46, 48 is also rotatable about itself, that is, its own axis. So when the mounting plate 26, 27 is rotated in one direction, which may automatically be encompassed by a change of the resolution of the sub-array 44, 46, 48 arranged thereon, the resolution can be maintained by rotating the sub-array 44, 46, 48 about itself in the opposite direction.

FIGS. 6 to 9 show different operating positions of the sub-arrays 44, 46, 48 of the marking and/or scanning head 20 according to FIG. 5. In each of the figures three markings 74 are applied on an object 70 by means of the three sub-arrays 44, 46, 48 of marking devices 40. Of course, any other number of sub-arrays 44, 46, 48 can be provided and any other number of markings 74 can be applied.

For marking the object 70, the object 70 is moved along an advance direction 16, which may also be called an object movement direction, relative to the marking and/or scanning head 20.

Figure 6:
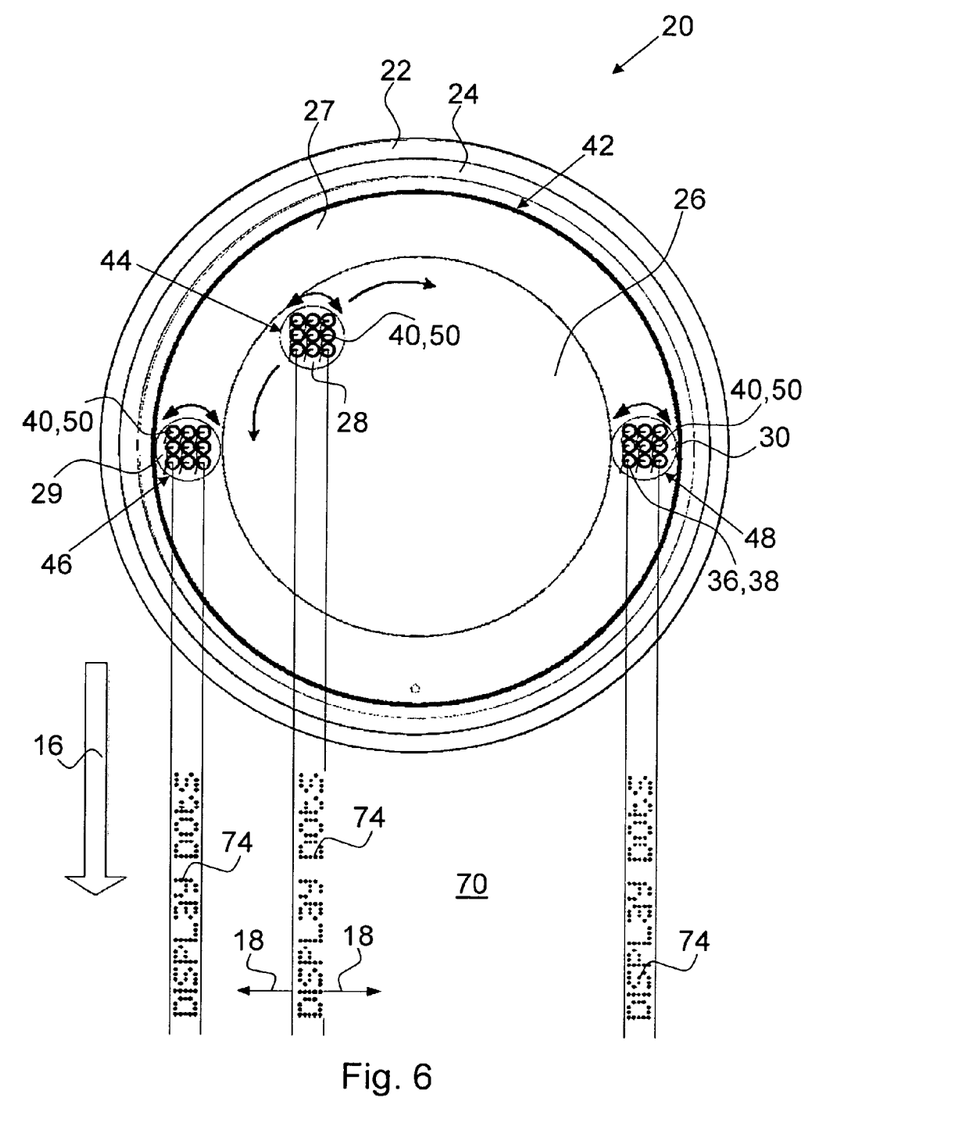
FIG. 6 shows a first operation of the marking head according to FIG. 5.
Figure 7:
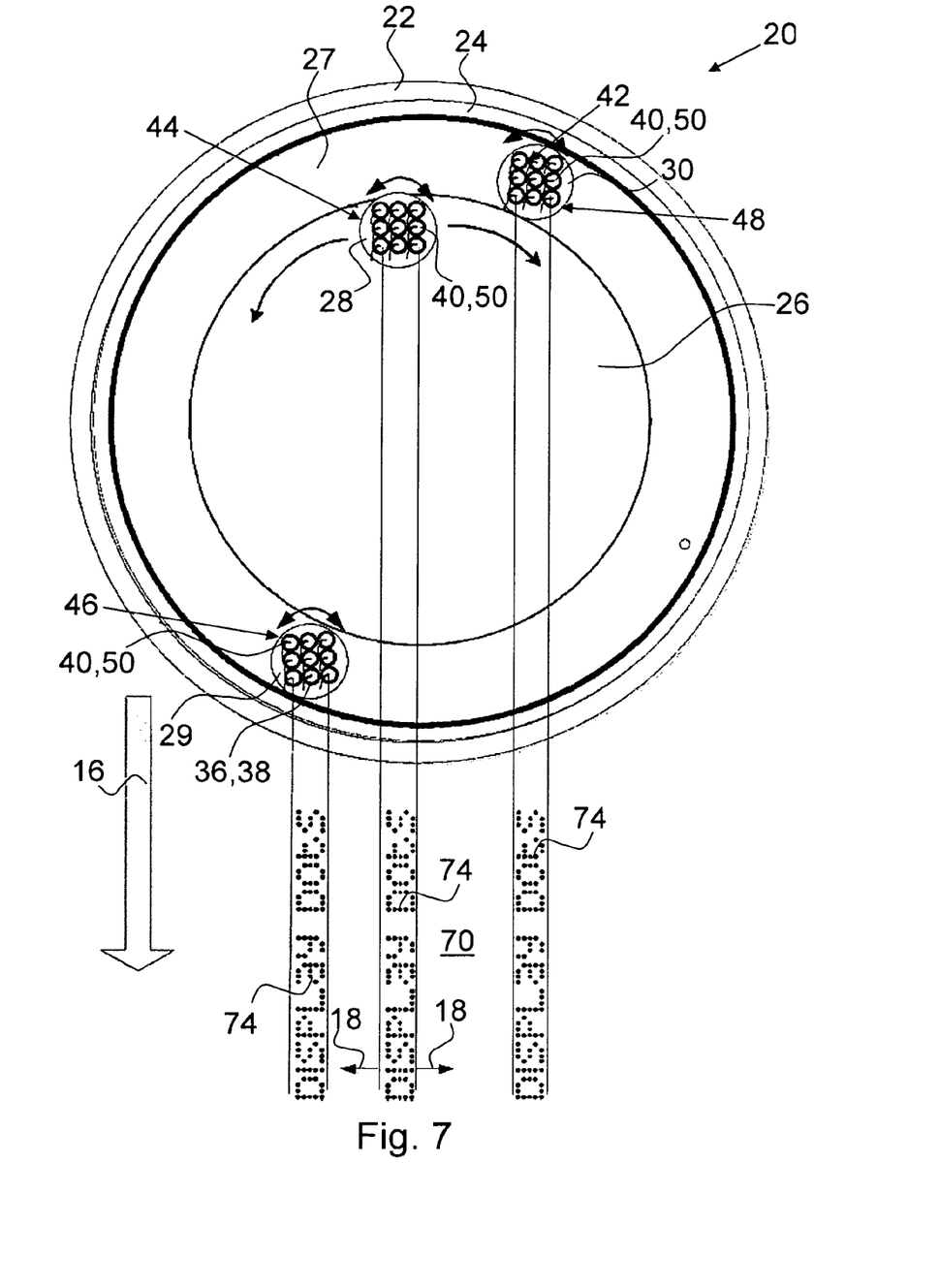
FIG. 7 shows a second operation of the marking head according to FIG. 5.

In FIGS. 6 and 7 the individual markings 74 are spaced from one another by a predetermined distance 32 in the transverse direction 18. The distance 32 or spacing can be adjusted by moving and/or rotating one or more of the individual sub-arrays 44, 46, 48 of marking devices 40. So, for example, if different marking operations are to be performed with the head 20, one or more of the mounting plates 26, 27 and/or one or more of the receiving plates 28, 29, 30 of the head 20 are moved so as to place the sub-arrays 44, 46, 48 in a desired position relative to the object 70. In addition, the resolution of each of the sub-arrays 44, 46, 48 can be individually controlled by rotating the sub-arrays 44, 46, 48 about themselves.

Figure 8:
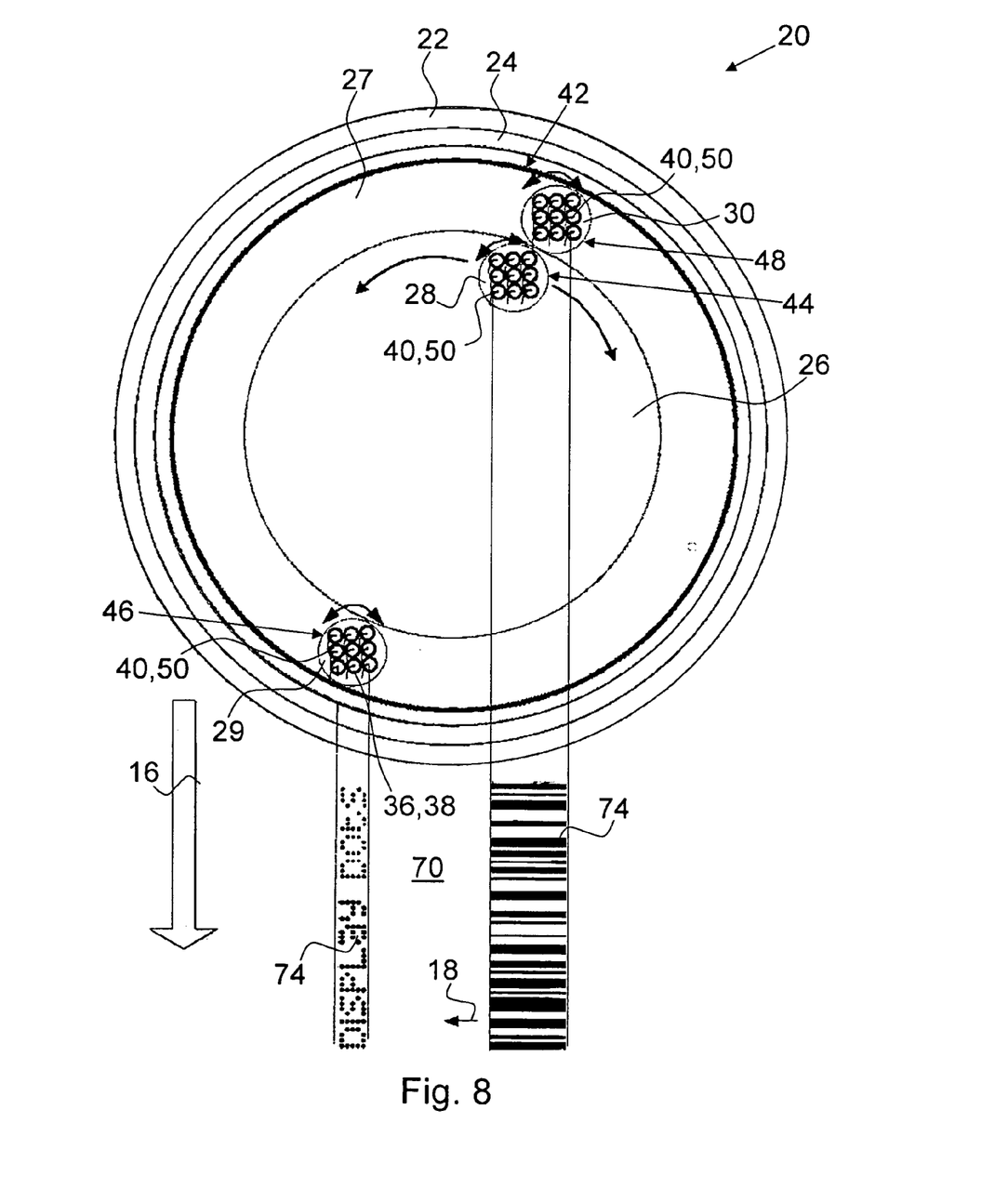
FIG. 8 shows a third operation of the marking head according to FIG. 5.

The individual sub-arrays 44, 46, 48 may be preferably supported on the marking and/or scanning head 20 such that they may be positioned directly side by side in the trans-verse direction, as shown in FIG. 8. Therefore, a marking and/or scanning width can be enhanced by positioning at least two sub-arrays 44, 46, 48 side by side.

Figure 9:
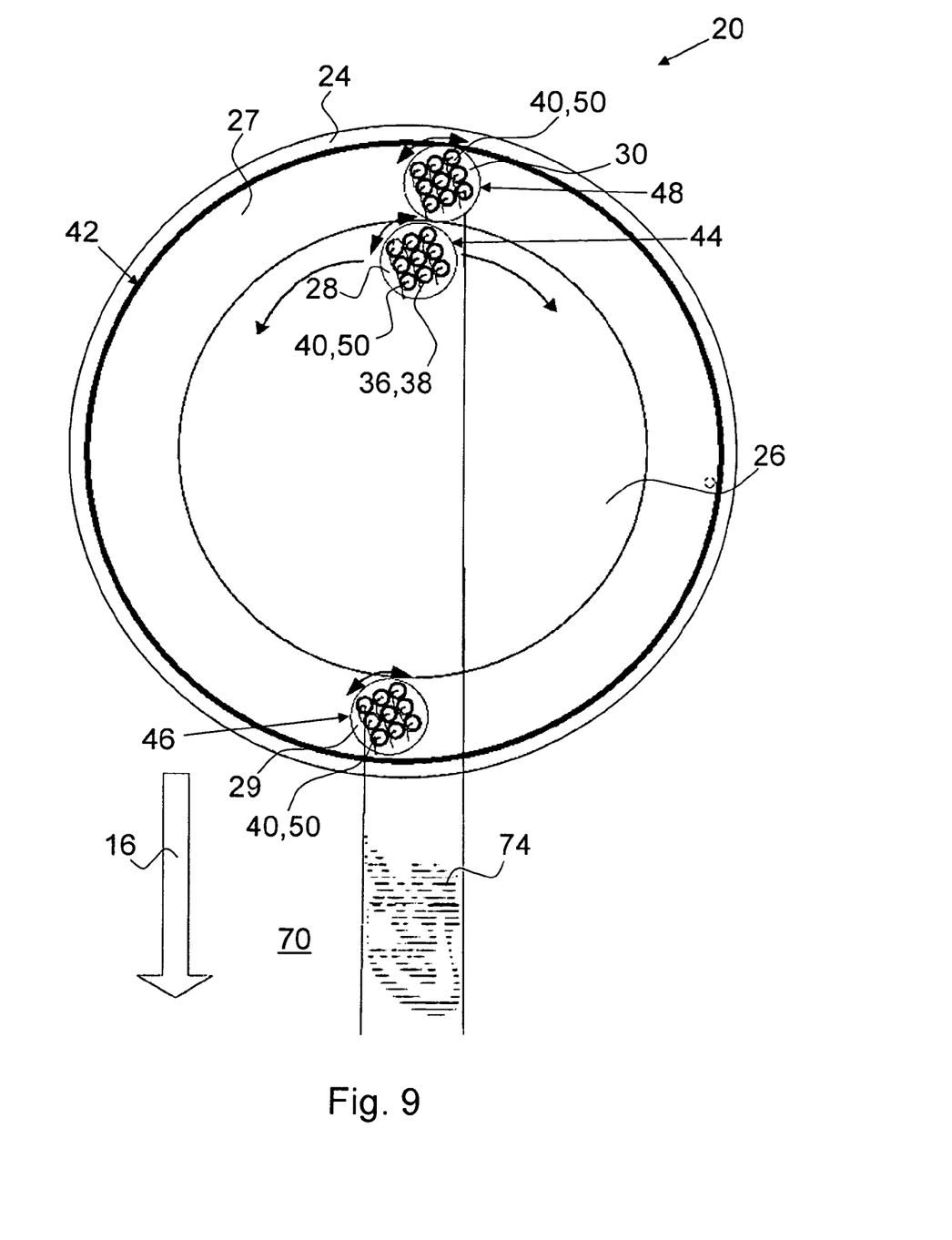
FIG. 9 shows a fourth operation of the marking head according to FIG. 5.

The individual sub-arrays 44, 46, 48 can also be supported on the marking and/or scanning head 20 such that they may be positioned in an overlapping manner. This means in particular that at least two of the sub-arrays 44, 46, 48 may at least partly overlap in the transverse direction, as shown in FIG. 9. Therefore, the marking and/or scanning resolution may be enhanced by positioning at least two sub-arrays 44, 46, 48 in an overlapping manner.

Figure 10:
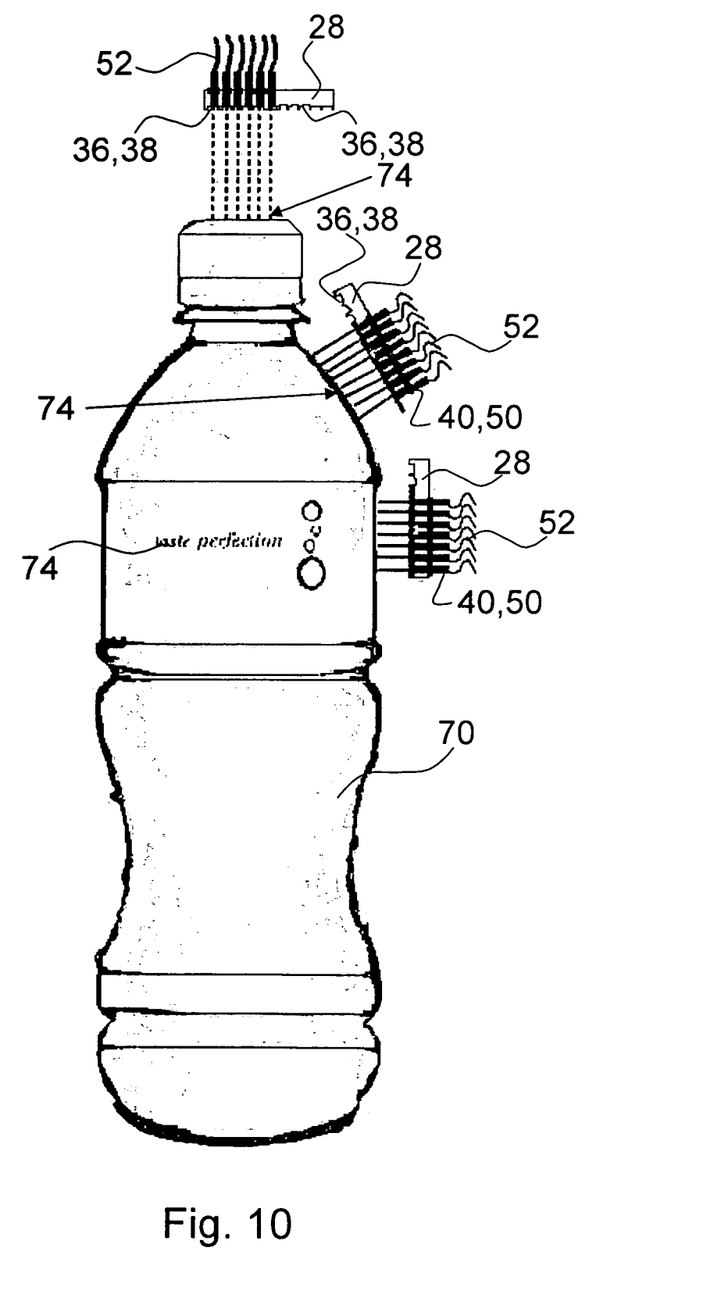
FIG. 10 shows a marking and/or scanning apparatus having a plurality of marking heads and an object to be marked by the apparatus.

FIG. 10 schematically shows a marking and/or scanning apparatus 10 having a plurality of marking heads 20a, 20b, 20c. The orientation of the individual marking and/or scanning heads 20a, 20b, 20c may be adjusted according to a given marking and/or scanning task, in particular depending on the orientation of a surface to be marked and/or scanned.

In FIG. 10 an object 70 in form of a bottle is marked on different portions of its surface. A first marking and/or scanning head 20a applies a marking 74 on a cap of the bottle. Second and third marking and/or scanning heads 20b, 20c are configured to apply a marking 74 on surfaces of the object 70 which are inclined to one another.

The individual marking and/or scanning heads 20a, 20b, 20c shown in FIG. 10 may each include one or more sub-arrays 44, 46, 48 of marking and/or sensing devices 40. At least one of the marking and/or scanning heads 20a, 20b, 20c may be a head as described in connection with FIGS. 1 to 9.

The individual marking and/or scanning heads 20a, 20b, 20c may be controlled by a single control unit.

The marking and/or sensing devices 40 may include ferrules 50 with one or more fibres 52 arranged therein. The ferrules 50 may be arranged in one or more receiving plates 28, 29, 30 of the marking and/or scanning head 20.

The inventive marking and/or scanning head and the inventive marking and/or scanning apparatus may provide an enhanced flexibility in marking and/or scanning objects.

The invention claimed is:

1. A head for at least one of marking and scanning, comprising:
    a plurality of receiving spaces in which individual devices for at least one of marking and sensing can be arranged for at least one of marking and scanning an object,
    wherein the receiving spaces are arranged in at least two sub-arrays, and wherein at least one sub-array is movable or rotatable relative to at least one other sub-array,
    wherein
    the head further comprises a holding frame,
    the at least two sub-arrays are mounted on a common mounting frame which is movable or rotatable relative to the holding frame,
    the sub-arrays are each rotatable about a rotation axis running through the centre of the respective sub-array, and
    the receiving spaces of each sub-array are arranged in a plurality of rows and columns, such that a two-dimensional array of receiving spaces is formed.

2. The head of claim 1, wherein
at least one sub-array is movable along a linear movement path.

3. The head of claim 1, wherein
at least one sub-array is rotatable about a rotation axis extending transversely to a plane of the object to be marked/scanned.

4. The head of claim 3, wherein
the rotation axis is a central axis of the head.

5. The head of one of claim 1, wherein
at least one of the sub-arrays is rotatable about a rotation axis running through its centre.

6. The head of one of claim 1, wherein
the rows and columns, in which the receiving spaces are arranged, extend perpendicularly to each other.

7. The head of one of claim 1, wherein
the receiving spaces of each sub-array have an equal spacing in at least one of a row direction and in a column direction.

8. An apparatus for at least one of marking and scanning an object, comprising:
at least one head as defined in claim 1, and
a driving mechanism for providing a relative movement of the object to be marked/scanned relative to the head in an advance direction during a marking or scanning operation.

9. The apparatus of claim 8, wherein
at least two heads are provided, wherein at least one head is movable or rotatable relative to at least one other head.

10. A method for operating a head for at least one of marking and scanning,
the head comprising:
a plurality of receiving spaces in which individual devices for at least one of marking and sensing can be arranged for at least one of marking and scanning an object,
wherein the receiving spaces are arranged in at least two sub-arrays, and wherein at least one sub-array is movable or rotatable relative to at least one other sub-array,
wherein the head further comprises a holding frame,
the at least two sub-arrays are mounted on a common mounting frame which is movable or rotatable relative to the holding frame,
the sub-arrays are each rotatable about a rotation axis running through the centre of the respective sub-array, and
the receiving spaces of each sub-array are arranged in a plurality of rows and columns, such that a two-dimensional array of receiving spaces is formed,
wherein the method comprises the steps that:
a first sub-array of devices for at least one of marking and sensing is moved or rotated relative to a second sub-array of devices for at least one of marking and sensing and
the object is at least one of: marked and scanned, by the first and second sub-arrays of devices for at least one of marking and sensing.

* * * * *